United States Patent
Chang et al.

(10) Patent No.: US 9,712,524 B2
(45) Date of Patent: Jul. 18, 2017

(54) METHOD AND APPARATUS FOR USER AUTHENTICATION

(71) Applicant: Samsung Electronics Co., Ltd., Gyeonggi-do (KR)

(72) Inventors: Moonsoo Chang, Gyeonggi-do (KR); Taeho Kim, Seoul (KR); Heejun You, Gyeonggi-do (KR); Yangsoo Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/623,845

(22) Filed: Feb. 17, 2015

(65) Prior Publication Data

US 2015/0237046 A1 Aug. 20, 2015

(30) Foreign Application Priority Data

Feb. 19, 2014 (KR) ........................ 10-2014-0018998

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *G06F 21/32* | (2013.01) |
| *G06F 21/53* | (2013.01) |
| *H04W 12/06* | (2009.01) |

(52) U.S. Cl.
CPC .......... *H04L 63/0861* (2013.01); *G06F 21/32* (2013.01); *G06F 21/53* (2013.01); *H04W 12/06* (2013.01)

(58) Field of Classification Search
CPC .................................................. H04L 63/0861
USPC ............................................................. 726/7
See application file for complete search history.

(56) References Cited

U.S. PATENT DOCUMENTS

| | | | |
|---|---|---|---|
| 7,702,919 B2 | 4/2010 | Jonas | |
| 2002/0144128 A1* | 10/2002 | Rahman | H04L 63/0861 713/186 |
| 2005/0223220 A1* | 10/2005 | Campbell | G06F 9/45537 713/164 |
| 2007/0106895 A1* | 5/2007 | Huang | H04L 9/0866 713/170 |
| 2008/0031448 A1* | 2/2008 | Dang | H04N 7/1675 380/200 |
| 2009/0282466 A1* | 11/2009 | Uchida | H04L 63/0861 726/7 |
| 2011/0213981 A1 | 9/2011 | Griffin | |
| 2013/0227664 A1* | 8/2013 | McKay | H04L 9/3231 726/7 |

* cited by examiner

*Primary Examiner* — Dant Shaifer Harriman
(74) *Attorney, Agent, or Firm* — Cha & Reiter, LLC

(57) ABSTRACT

An electronic device is provided including a biometric sensor, a memory, and a processor configured to: initiate a transaction with a server; receive an authentication request from the server; retrieve a biometric template stored in a secure portion of the memory in response to the authentication request; capturing a biometric sample using the biometric sensor; comparing the biometric template with the biometric sample; and transmitting to the server a message indicating an outcome of the comparison.

8 Claims, 8 Drawing Sheets

METHOD AND APPARATUS FOR USER AUTHENTICATION

CLAIM OF PRIORITY

This application claims priority from and the benefit under 35 U.S.C. §119(a) of Korean Patent Application No. 10-2014-0018998, filed on Feb. 19, 2014, which is hereby incorporated by reference for all purposes as if fully set forth herein.

BACKGROUND

1. Field of the Disclosure

The present disclosure relates generally to electronic devices and more particularly to a method and apparatus for user authentication.

2. Description of the Prior Art

Various security methods have been suggested and used to manage important documents or data as civilization has developed. Particularly, due to the development of electronic technologies, a large amount of data can be stored in a small device and thus security technology is more important. As the importance of the security technology increases, various security processing methods have appeared. For example, the security processing methods are developed in various types such as a method using a security card for user identification and authentication, a method using a password which is periodically changed by the user, and a method using biometric information which is different for each person.

Different types of security technologies are applied everywhere security is required, demands for identifying and authenticating users using biometric information having different pieces of information based on each person have recently increased. Each company determines a security level and people who desire to enter specific places need stronger security. For example, different features based on each person such as a fingerprint, face, iris, voice, lines on the palm, and veins are used as biometric information.

Meanwhile, according to the recent development of electronic technologies, personal electronic devices have strengthened security to prevent information leakage. For example, various electronic devices such as smart phones or notebook computers use biometric information more and more to manage important personal information.

When biometric information is used, security can be strengthened, but, if the biometric information is leaked, the damage may be huge. This is because, if the biometric is leaked once, a change in personal biometric information is not possible. When fingerprint is leaked, it is not possible to change the leaked personal fingerprint. Particularly, when an electronic device enabling wireless communication performs a security process with an external device, for example, another terminal or server using biometric information, the biometric information may be leaked. In this case, it may lead to irreversible damage to users.

SUMMARY

According to aspects of the disclosure, a method is provided comprising: initiating, by an electronic device, a transaction with a server; receive an authentication request from the server; retrieving a biometric template stored in a secure portion of a memory of the electronic device in response to the authentication request; capturing a biometric sample using a biometric sensor of the electronic device; comparing the biometric template with the biometric sample; and transmitting to the server a message indicating an outcome of the comparing.

According to aspects of the disclosure, an electronic device is provided comprising a biometric sensor, a memory, and a processor configured to: initiate a transaction with a server; receive an authentication request from the server; retrieve a biometric template stored in a secure portion of the memory in response to the authentication request; capture a biometric sample using the biometric sensor; compare the biometric template with the biometric sample; and transmit to the server a message indicating an outcome of the comparison.

BRIEF DESCRIPTION OF THE DRAWINGS

The above features and advantages of the disclosure will be more apparent from the following detailed description in conjunction with the accompanying drawings, in which.

DETAILED DESCRIPTION

Figure 1:
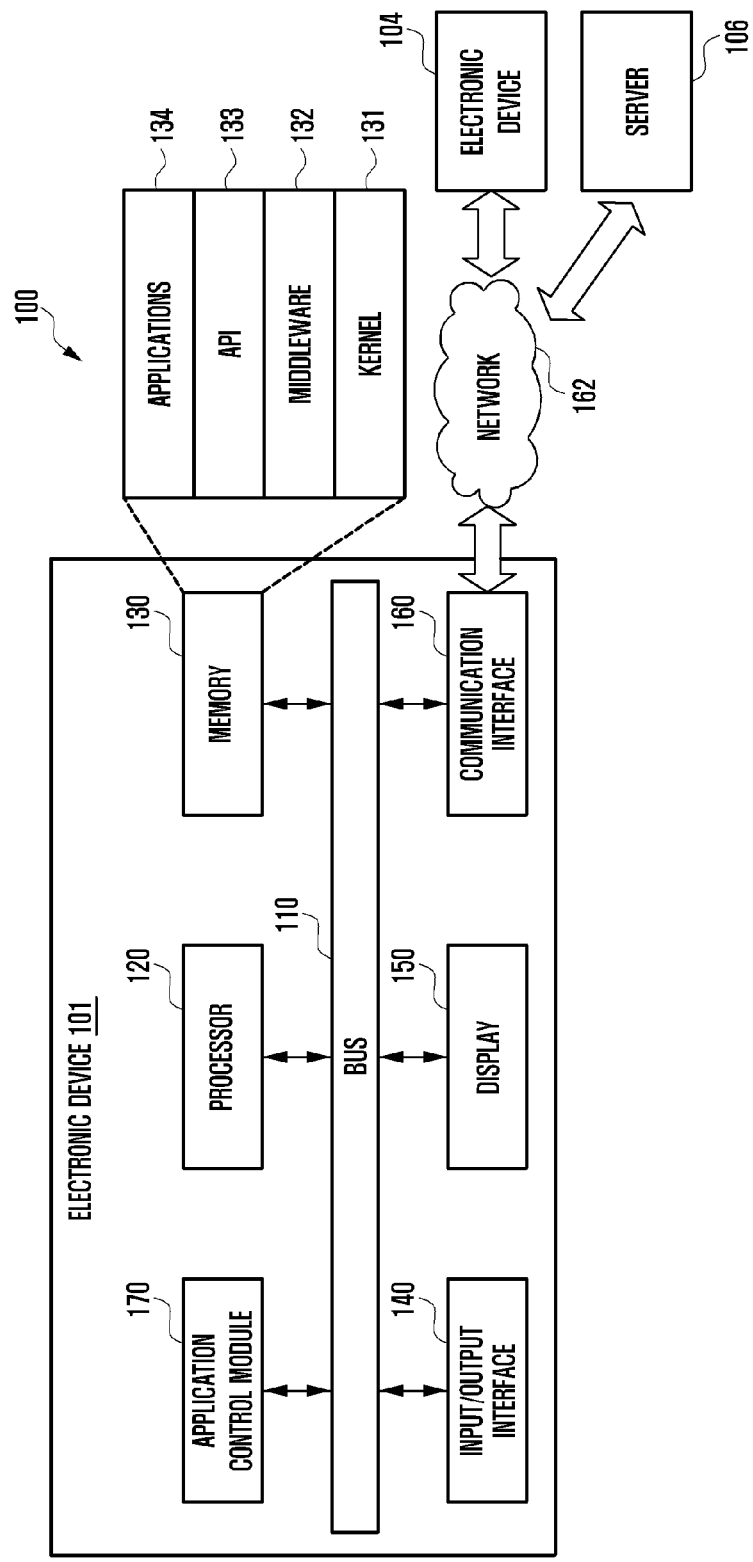
FIG. 1 illustrates is a block diagram of an example of an electronic device, according to one aspect of the disclosure.

Hereinafter, the present disclosure will be described with reference to the accompanying drawings. The present disclosure may have various modifications and thus will be described in detail with reference to specific examples illustrated in the drawings. However, it should be understood that there is no intent to limit the present disclosure to those examples; rather, the present disclosure should be construed to cover all modifications, equivalents, and/or alternatives falling within the spirit and scope of the disclosure.

As used herein, the expression "include" or "may include" refers to the existence of a corresponding function, operation, or element, and does not exclude one or more additional functions, operations, or elements. Also, as used herein, the terms "include" and/or "have" should be construed to denote a certain feature, number, step, operation, element, component or a combination thereof, and should not be construed to exclude the existence or possible addition of one or more other features, numbers, steps, operations, elements, components, or combinations thereof.

Also, as used here, the expression "or" includes any or all combinations of words enumerated together. For example, the expression "A or B" may include A, may include B, or may include both A and B.

In the present disclosure, the expressions "a first", "a second", "the first", "the second", and the like may modify various elements, but the corresponding elements are not limited by these expressions. For example, the above expressions do not limit the sequence and/or importance of the corresponding elements. The above expressions may be used merely for the purpose of distinguishing one element from the other elements. For example, a first user device and a second user device indicate different user devices although both of them are user devices. For example, a first element may be termed a second element, and similarly, a second element may be termed a first element without departing from the scope of the present disclosure.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The terms used in the present disclosure are only used to describe specific examples, and are not intended to limit the present disclosure. As used herein, the singular forms are intended to include the plural forms as well, unless the context clearly indicates otherwise.

Unless defined otherwise, all terms used herein, including technical and scientific terms, have the same meaning as those commonly understood by a person of ordinary skill in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch).

According to aspects of the disclosure, an electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to aspects of the disclosure, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to aspects of the disclosure, the electronic devices may include at least one of furniture or a part of a building/structure having a communication function, electronic boards, electronic signature receiving devices, projectors, or various measuring equipment (e.g., equipment for a water supply, electricity, gases or radio waves). The electronic device according to the present disclosure may be a combination of one or more of the aforementioned various devices. Also, the electronic device according to the present disclosure may be a flexible device. Further, it is obvious to those skilled in the art that the electronic device according to the present disclosure is not limited to the aforementioned devices.

Hereinafter, an example of an electronic device according will be described with reference to the accompanying drawings. According to aspects of the disclosure, the term "user" may indicate a person using an electronic device or a device (e.g. an artificial intelligence electronic device) using an electronic device.

FIG. 1 is a block diagram of an electronic device, according to according to one aspect of the disclosure. Referring to FIG. 1, the electronic device 101 may include a bus 110, a processor 120, a memory 130, an input/output interface 140, a display 150, a communication interface 160, and an application control module 170.

The bus 110 may be a circuit for connecting the components described above and transmitting communication (for example, a control message) between the components described above.

The processor 120 may include any suitable type of processing circuitry, such as a general purpose processor (e.g., an ARM-based processor), Field-Programmable Gate Array (FPGA), an Application-Specific Integrated Circuit (ASIC), a Digital Signal Processor (DSP), a Programmable Logic Device (PLD), etc. The processor 120 may receive commands from other components (for example, the memory 130, the input/output interface 140, the display 150, the communication interface 160, and the application control module 170) through the bus 110, may interpret the received commands, and may execute calculation or data processing according to the interpreted commands. Further, in some aspects, the processor 120 may divide the operation into an operation in a general area and an operation in a security area to perform the operation. The operation in the general area may refer to the operation in an area where the user can transmit/receive and process data without any restriction. Further, the operation in the security area may refer to the operation in an area where the user can transmit/receive and process data which has passed through a particular encryption. For example, the security area may be an area where biometric information is handled, an area where data required to be secured by a company, or an area where data required to be secured by a user.

The memory 130 may store commands or data received from the processor 120 or other components (for example, the input/output interface 140, the display 150, the communication interface 160, or the application control module 170) or may store commands or data generated by the processor 120 or other components. The memory 130 may include programming modules, for example, a kernel 131, middleware 132, an Application Programming Interface (API) 133, an application 134, or the like. Each of the programming modules described above may be formed of software, firmware, and hardware, or a combination thereof. According to aspects of the disclosure, the memory 130 may be divided into a memory for storing data of the general area and a memory for storing data of the security area. Further, the memory 130 may store control data or a program for operations in the general area and store control data or a program for operations in the security area.

The kernel 131 may control or manage the remaining programming modules, for example, system resources (for example, the bus 110, the processor 120, or the memory 130) used for executing operations or functions embodied in the middleware 132, the API 133, or the application 134. Also, the kernel 131 may provide an interface to the middleware 132, the API 133, or the application 134, so as to access each component element of the electronic device 101 for controlling or managing.

The middleware 132 can perform a relay function which allows the API 133 or the application 134 to communicate with and exchange data with the kernel 131. Furthermore, in regard to task requests received from the applications 134, the middleware 132 may perform a control (for example, scheduling or load balancing) for the task requests using, for example, a method of assigning priorities by which the system resources (for example, the bus 110, the processor 120, or the memory 130) of the electronic device 101 may be used for at least one of the applications 134.

The API 133 is an interface used by the application 134 to control a function provided from the kernel 131 or the middleware 132, and may include, for example, at least one interface or function (for example, an instruction) for a file control, a window control, image processing, a character control, or the like.

According to aspects of the disclosure, the applications 134 may include an SMS/MMS application, an e-mail application, a calendar application, an alarm application, a health care application, for example, an application for measuring an amount of exercise or blood sugar, and an environmental information application, for example, an application for providing atmospheric pressure information, humidity information, temperature information, and the like. Additionally or alternately, the applications 134 may include an application related to an information exchange between the electronic device 101 and an external electronic device (for example, an electronic device 104). The application associated with exchanging information may include, for example, a notification relay application for transferring predetermined information to an external electronic device or a device management application for managing an external electronic device.

For example, the notification relay application may include a function of transferring, to the external electronic device, for example, the electronic device 101, notification information generated from other applications of the electronic device 104, for example, an SMS/MMS application, an e-mail application, a health management application, an environmental information application, and the like. Additionally or alternatively, the notification relay application may receive notification information from, for example, an external electronic device, for example, the electronic device 104, and may provide the notification information to a user. The device management application may manage (for example, install, delete, or update), for example, a function of at least a part of an external electronic device (for example, the electronic device 104) that communicates with the electronic device 101 (for example, turning on/off the external electronic device (or a few components) or adjusting brightness (or resolution) of a display), an application operating in the external electronic device, or a service provided by the external electronic device (for example a call service or a message service).

According to aspects of the disclosure, the applications 134 may include an application designated based on attributes (for example, a type of electronic device) of an external electronic device (for example, the electronic device 104). For example, when the external electronic device is an MP3 player, the applications 134 may include an application related to the reproduction of music. Similarly, when the external electronic device is a mobile medical device, the applications 134 may include an application related to health care. According to aspects of the disclosure, the applications 134 may include at least one of an application designated to the electronic device 101 and an application received from the external electronic device (for example, a server 106 or the electronic device 104).

The input/output interface 140 may transfer a command or data input by a user through an input/output device (for example, a sensor, a keyboard, or a touch screen) to the processor 120, the memory 130, the communication interface 160, or the application control module 170, for example, through the bus 110. For example, the input/output interface 140 may provide the processor 120 with data corresponding to a touch of the user received as input through a touch screen. Further, the input/output interface 140 may output, for example, a command or data received through the bus 110 from the processor 120, the memory 130, the communication interface 160, or the application control module 170, through an input/output device (for example, a speaker or a display). For example, the input/output interface 140 may output voice data processed by the processor 120 to the user through a speaker.

The display 150 may display various pieces of information (for example, multimedia data or text data) to a user. The display 150 may be implemented by a flexible display according to aspects of the disclosure.

The communication interface 160 may connect communication between the electronic device 101 and an external electronic device (for example, the electronic device 104 or the server 106). For example, the communication interface 160 may be connected to the network 162 through wireless communication or wired communication to communicate with an external device. The wireless communication may include at least one of, for example, Wi-Fi, Bluetooth (BT), Near Field Communication (NFC), Global Positioning System (GPS) and cellular communication (for example LTE, LTE-A, CDMA, WCDMA, UMTS, WiBro, GSM, etc.). The wired communication may include at least one of, for example, a Universal Serial Bus (USB), a High Definition Multimedia Interface (HDMI), a Recommended Standard 232 (RS-232), and a Plain Old Telephone Service (POTS).

According to aspects of the disclosure, the network 162 may be a communication network. The communication network may include at least one of a computer network, the Internet, the Internet of things, or a telephone network. According to aspects of the disclosure, a protocol (for example, a transport layer protocol, data link layer protocol, or a physical layer protocol) for communication between the electronic device 101 and the external device may be supported by at least one of the applications 134, the application programming interface 133, the middleware 132, the kernel 131, or the communication interface 160.

The application control module 170 may process at least some pieces of information acquired from other components (for example, the processor 120, the memory 130, the input/output interface 140, or the communication interface 160), and may provide the processed information to the user through various methods. For example, the application control module 170 may recognize a connection component included in the electronic device 101, store information on the access component in the memory 130, and execute the applications 134 based on the information of the connection component. According to aspects of the disclosure, the application control module 170 may be driven by the processor 120.

Figure 2:
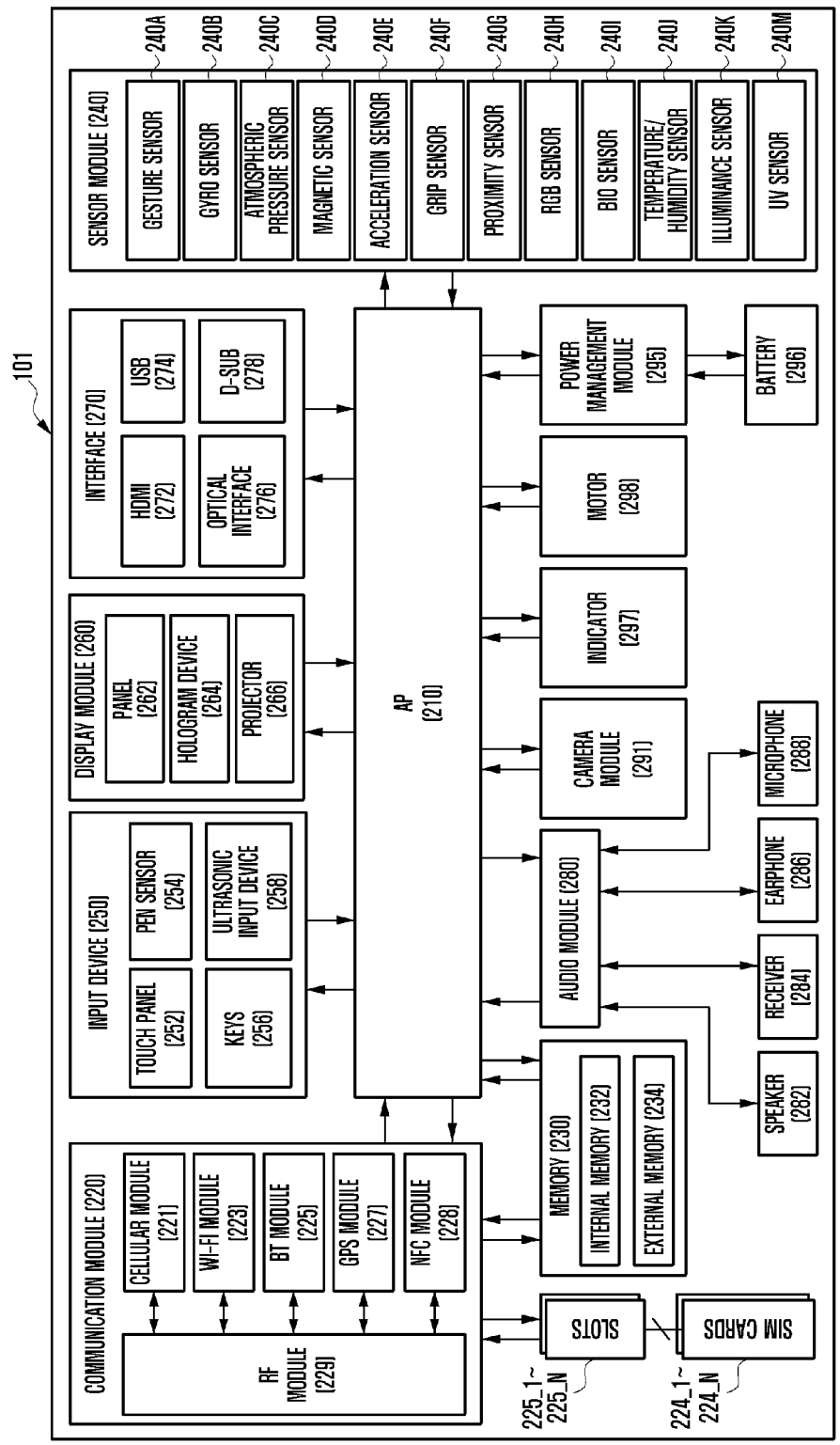
FIG. 2 is a block diagram of the electronic device according to another aspect of the disclosure.

FIG. 2 is a block diagram of the electronic device of FIG. 1, according to another aspect of the disclosure. The electronic device 201 may include, for example, all or some of the electronic device 101 illustrated in FIG. 1. Referring to FIG. 2, the electronic device 201 may include one or more Application Processors (APs) 210, a communication module 220, a Subscriber Identifier Module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software components connected to the AP 210 by driving an operating system or an application program and process various pieces of data including multimedia data and perform calculations. The AP 210 may be implemented by, for example, a System on Chip (SoC). According to aspects of the disclosure, the AP 210 may further include a Graphic Processing Unit (GPU) (not illustrated).

The communication module 220 (for example, the communication interface 160) may perform data transmission/reception in communication between the electronic device 201 (for example, the electronic device 101) and other electronic devices (for example, the electronic device 104 or the server 106) connected thereto through a network. According to aspects of the disclosure, the communication module 220 may include a cellular module 221, a Wi-Fi module 223, a BT module 225, a GPS module 227, an NFC module 228, and a Radio Frequency (RF) module 229.

The cellular module 221 may provide a voice, a call, a video call, a Short Message Service (SMS), or an Internet service through a communication network (for example, Long Term Evolution (LTE), LTE-A, Code Division Multiple Access (CDMA), Wideband CDMA (WCDMA), Universal Mobile Telecommunication System (UMTS), Wireless Broadband (WiBro), or Global System for Mobile communication (GSM)). Furthermore, the cellular module 221 may distinguish and authenticate electronic devices within a communication network using a subscriber identification module (for example, the SIM card 224). According to aspects of the disclosure, the cellular module 221 may perform at least some of the function that may be provided by the AP 210. For example, the cellular module 221 may perform at least some of multimedia control functions.

According to aspects of the disclosure, the cellular module 221 may include a Communication Processor (CP). Furthermore, the cellular module 221 may be implemented by, for example, an SoC. Although the components such as the cellular module 221 (for example, the communication processor), the memory 230, or the power management module 295 are illustrated as being separated from the AP 210 in FIG. 2, the AP 210 may include at least some of the aforementioned components (for example, the cellular module 221) according to aspects of the disclosure.

According to aspects of the disclosure, the AP 210 or the cellular module 221 (for example, the communication processor) may load a command or data received from at least one of a non-volatile memory and other component elements connected thereto to a volatile memory and process the loaded command or data. Further, the AP 210 or the cellular module 221 may store data received from or generated by at least one of the other components in a non-volatile memory.

According to aspects of the disclosure, the AP 210 may divide operations into operations in the general area and operations in the security area to perform the divided operations. Since operations in the general area and operations in the security area are the same as those described in FIG. 1, a more detailed description will be omitted.

For example, each of the Wi-Fi module 223, the BT module 225, the GPS module 227, and the NFC module 228 may include a processor for processing data transmitted/received through the corresponding module. In FIG. 2, the cellular module 221, the WiFi module 223, the BT module 225, the GPS module 227, and the NFC module 228 are illustrated as separate blocks, but at least some (for example, two or more) of the cellular module 221, the WiFi module 223, the BT module 225, the GPS module 227, and the NFC module 228 may be included in one Integrated Chip (IC) or one IC package. For example, at least some (for example, the communication processor corresponding to the cellular module 221 and the Wi-Fi processor corresponding to the Wi-Fi module 223) of the processors corresponding to the cellular module 225, the Wi-Fi module 227, the BT module 228, the GPS module 221, and the NFC module 223 may be implemented by one SoC.

The RF module 229 may transmit data, for example, RF signals. Although not shown, the RF module 229 may include, for example, a transceiver, a Power Amp Module (PAM), a frequency filter, and a Low Noise Amplifier (LNA). Further, the RF module 229 may further include a component for transmitting/receiving electronic waves over free air space in wireless communication, for example, a conductor, a conducting wire or the like. Although the cellular module 221, the Wi-Fi module 223, the BT module 225, the GPS module 227, and the NFC module 228 share one RF module 729 in FIG. 2, at least one of the cellular module 221, the Wi-Fi module 229, the BT module 223, the GPS module 225, and the NFC module 227 may transmit/receive an RF signal through a separate RF module in one example.

The SIM cards 224_1 to 224_N may be cards including a subscriber identification module and may be inserted into slots 225_1 to 225_N formed on a particular portion of the electronic device. The SIM card 224_1 to 224_N may include unique identification information such as Integrated Circuit Card Identifier (ICCID), or subscriber information such as International Mobile Subscriber Identity (IMSI).

The memory 230 (for example, the memory 130) may include an internal memory 232 or an external memory 234. The internal memory 232 may include at least one of a volatile memory (for example, a Dynamic Random Access Memory (DRAM), a Static RAM (SRAM), a Synchronous Dynamic RAM (SDRAM), or the like) or a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like).

According to aspects of the disclosure, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 234 may be functionally connected to the electronic device 201 through various interfaces.

According to aspects of the disclosure, the electronic device 201 may further include a storage device (or storage medium) such as a hard drive.

According to aspects of the disclosure, the memory 230 may be divided into a memory for storing data of the general area and a memory for storing data of the security area. In the general area, access to data in an area for processing the data of the security area may be limited or blocked. Further, the memory 130 may store control data or a program for the operation in the general area and store control data or a program for the operation in the security area.

The sensor module 240 may measure physical quantity or sense an operation state of an electronic device 201, and convert the measured or sensed information into an electric signal. The sensor module 240 may include, for example, at least one of a gesture sensor 240A, a gyro sensor 240B, an atmospheric pressure sensor 840C, a magnetic sensor 240D, an acceleration sensor 240E, a grip sensor 240F, a proximity sensor 240G, a color sensor 240H (for example, red, green, and blue (RGB) sensor), a biometric sensor 240I, a temperature/humidity sensor 240J, an illumination sensor 240K, and a Ultra Violet (UV) sensor 240M. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and the like. The sensor module 240 may further include a control circuit for controlling one or more sensors included therein. In the following description, all types of sensors that collect biometric information of the user such as an iris sensor or a fingerprint sensor will be referred to as a "biometric sensor". The biometric sensor may be included in the input device 250 described below.

The input device 250 may include a touch panel 252, a (digital) pen sensor 254, a key 256, or an ultrasonic input device 258. The touch panel 252 may recognize a touch input in at least one type among, for example, a capacitive type, a resistive type, an infrared type, and an acoustic wave type. Further, the touch panel 252 may further include a control circuit. The capacitive type touch panel may recognize physical contact or proximity. The touch panel 252 may further include a tactile layer. In this event, the touch panel 252 may provide a tactile response to a user.

The (digital) pen sensor 254 may be embodied, for example, using a method identical or similar to a method of receiving a touch input of a user, or using a separate recognition sheet. The key 256 may include, for example, a physical button, an optical key, or a keypad. The ultrasonic input device 258 may identify data by detecting an acoustic wave with a microphone (for example, microphone 288) of the electronic device 201 through an input unit generating an ultrasonic signal, and may perform wireless recognition. According to aspects of the disclosure, the electronic device 201 may use the communication module 220 to receive a user input from an external device connected thereto (for example, a computer or a server).

The display module 260 (for example, the display 150) may include a panel 262, a hologram device 264, or a projector 266. For example, the panel 262 may be a Liquid Crystal Display (LCD) or an Active Matrix Organic Light Emitting Diode (AM-OLED). The panel 262 may be implemented to be, for example, flexible, transparent, or wearable. The panel 262 may be configured by the touch panel 252 and one module. The hologram 264 may show a three-dimensional image in the air by using an interference of light. The projector 266 may project light on a screen to display an image. The screen may be located, for example, inside or outside the electronic device 201. According to aspects of the disclosure, the display module 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, and a D-subminiature (D-sub) 278. The interface 270 may be included in, for example, the communication interface 160 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280 may convert a sound and an electrical signal in bi-directions. At least some components of the audio module 280 may be included in, for example, the input/output interface 140 illustrated in FIG. 1. The audio codec 280 may convert voice information input or output through, for example, a speaker 282, a receiver 284, earphones 286, or a microphone 288.

The camera module 291 is a device which can photograph an image and a dynamic image. According to aspects of the disclosure, the camera module 291 may include one or more image sensors (for example, a front lens or a back lens), a lens (not shown), an Image Signal Processor (ISP) (not shown) or a flash (not shown) (for example, LED or xenon lamp).

The power management module 295 may manage power of the electronic device 201. Although not illustrated, the power management module 295 may include, for example, a Power Management Integrated Circuit (PMIC), a charger Integrated Circuit (IC), or a battery or fuel gauge.

The PMIC may be mounted on, for example, an integrated circuit or an SoC semiconductor. Charging methods may be classified into a wired charging method and a wireless charging method. The charger IC can charge a battery and can prevent the introduction of over-voltage or over-current from a charger. According to aspects of the disclosure, the charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery gauge can measure, for example, a residual quantity of the battery 296, and a voltage, a current, or a temperature during the charging. The battery 296 may store or generate electricity and may supply power to the electronic device 201 using the stored or generated electricity. The battery 296 may include, for example, a rechargeable battery or a solar battery.

The indicator 297 may display a predetermined state of the electronic device 201 or a part of the electronic device 201 (for example, the AP 210), such as a booting state, a message state, a charging state, or the like. The motor 298 may convert an electrical signal into a mechanical vibration. Although not illustrated, the electronic device 201 may include a processing device (for example, a GPU) for supporting mobile TV. The processing unit for supporting mobile TV can process media data according to a standard of Digital Multimedia Broadcasting (DMB), Digital Video Broadcasting (DVB), media flow, or the like.

Each of the components of the electronic device according to the present disclosure may be implemented by one or more components and the name of the corresponding component may vary depending on a type of the electronic device. The electronic device 101 may include at least one of the above-described elements. Some of the above-described elements may be omitted from the electronic device 101, or the electronic device 101 may further include additional elements. Further, some of the components of the electronic device according to the present disclosure may be combined to be one entity, which can perform the same functions as those of the components before the combination.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be a minimum unit of an integrated component element or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

Figure 3:
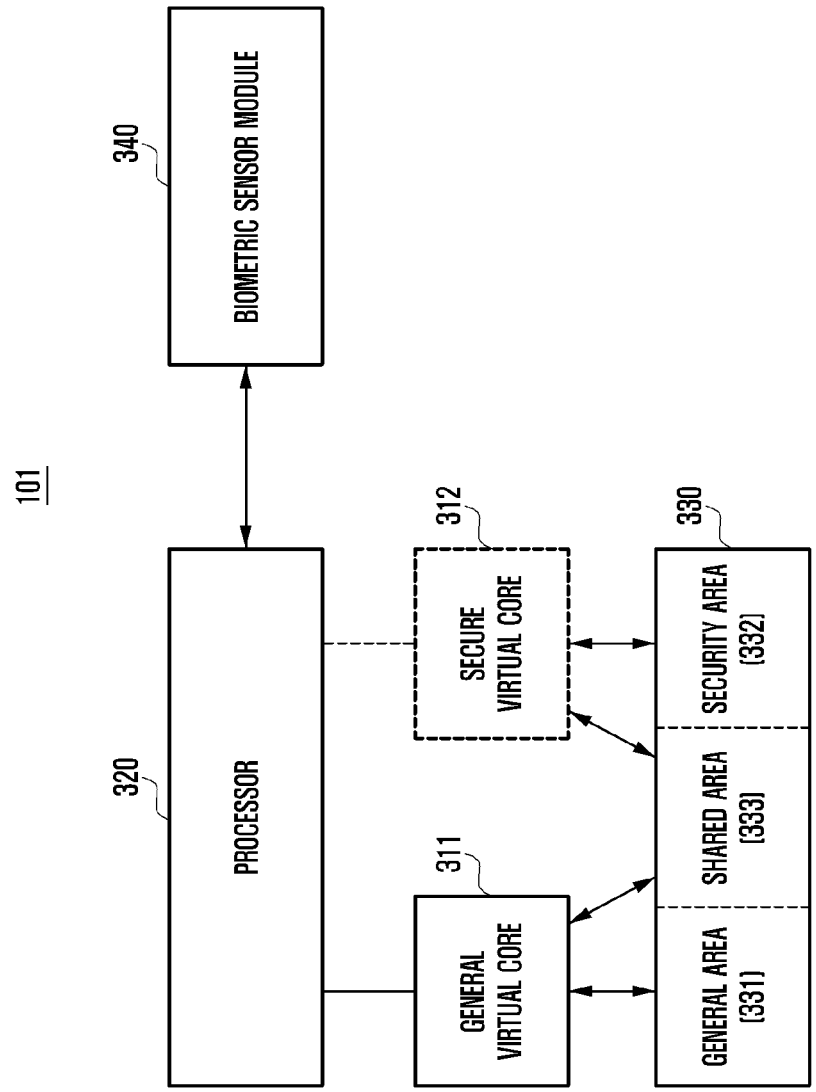
FIG. 3 is a block diagram of the electronic device according to yet another aspect of the disclosure.

FIG. 3 is a block diagram of the electronic device of FIG. 1, according to yet another aspect of the disclosure.

Referring to FIG. 3, the electronic device 101 according to aspects of the disclosure may include a processor 320 for dividing one core into two virtual cores. For example, the processor 320 may divide the core into a general virtual core 311 which performs tasks in a general mode (for example, a rich execution environment) and a secure virtual core which performs tasks in a security mode (for example, a trusted execution environment).

The processor 320 may call the general virtual core 311 or the secure virtual core 312 through a kernel driver (not shown). When the general virtual core is being used, the processor 320 is said to operate in general mode and when the secure virtual core is being used, the processor is said to operate in security mode.

The memory 330 may be partitioned into a general area 331, a security area 332, and a shared area 333. The general area 331 may store task commands or data through the general virtual core 311 and may include program modules (for example, a biometric information recognition application, a biometric information recognition service module or the like) executed when the system of the general virtual core 311 operates. For example, the program modules included in the general area 331 may be program modules having no access restrictions.

The security area 332 may store task commands or data through the secure virtual core 312 and may include program modules (for example, a biometric information processing module, a biometric information communication service module or the like) executed when the system of the secure virtual core 312 operates. For example, the program modules included in the security area may be program modules having access restrictions. The security area 332 may perform access by security access, or a reliable or authorized signal.

The shared area 333 may store commands or data which can access the system of the general virtual core 311 or the system of the secure virtual core 312 when the corresponding system operates. The shared area 333 may manage an address space of an operating system stored in the memory 330, and may include memory management information for resource allocation. The shared area 333 may store information for calling the general virtual core or the secure virtual core.

The biometric sensor module 340 may be used to capture a biometric sample of a user. The biometric sample may identify one or more characteristics of a recognition object. The recognition object may be a user's body or at least the part of the user's body. For example, the recognition object may be a fingerprint of the user, retina pattern of the user, ear shape of the user, facial feature of the user, voice of the user, finger shape of the user, and handwriting of the user.

The biometric sensor module 340 may include one or more biometric sensors. For example, the biometric sensor module 340 may include a fingerprint recognition sensor, a retina recognition sensor, or an iris recognition sensor. Further, the biometric sensor module 340 may include a camera for face recognition or iris recognition, an optical sensor such as infrared sensor, or a pressure sensor or a touch panel for detecting handwriting. According to aspects of the disclosure, the biometric sensor module 340 may receive sensing data from the outside of the electronic device or a separate electronic device.

It should be noted that the disclosure is not limited to using virtual cores. In some implementations, each a different physical core of the same processor may be used in place virtual cores 311 and 312. Additionally or alternatively, in some implementations, each of the virtual cores 311 and 312 may be substituted with a different processor (e.g., an x86 processor).

Figure 4:
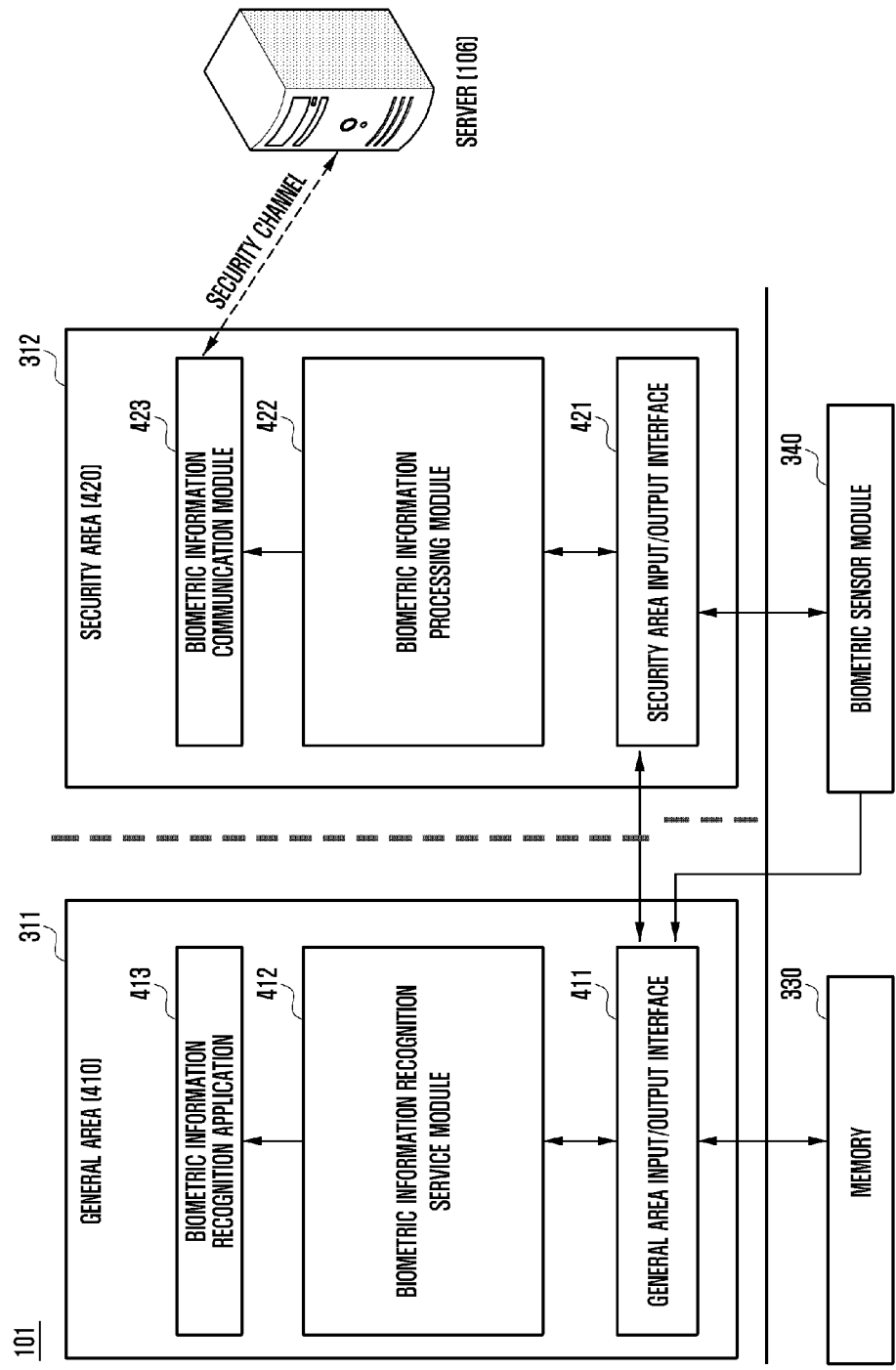
FIG. 4 is a block diagram of the electronic device, in accordance with yet another aspect of the disclosure.

FIG. 4 is a block diagram of the electronic device of FIG. 1, according to yet another aspect of the disclosure. As illustrated, the electronic device may be connected to a server 106 via a secure channel.

In some implementations, the general virtual core 311 may execute a biometric recognition application 413, a biometric information recognition service module 412, and a general input/output interface 411. In some implementations, each of the application 413, the biometric information recognition service module, and general area input/output interface may be implemented as one or more processor executable instructions. In some implementations, each of the application 413, the biometric information recognition service module, and general area input/putout interface may be stored in general area 331. In some implementations, the secure virtual core 312 may execute a biometric information communication module 423, a biometric information processing module 422, and a security area input output interface 421. In some implementations, each of the biometric information communication module 423, biometric information processing module 422, and security area input output interface 421 may be implemented as one or more processor executable instructions. In some implementations, each of the biometric information communication module 423, biometric information processing module 422, and security area input output interface 421 may be stored in the security area 332 of the memory 330.

The general area input/output interface may include a driver (not shown) for driving the biometric sensor module 340, a security area interface driver (not shown) for operating an interface with the security area 332, and an interface (not shown) for access to the memory. Accordingly, the general area input/output interface 411 may receive data from the biometric sensor module 340, and may store or read data in or from the memory 330. Further, the general area input/output interface 411 may provide data to the secure virtual core 312 (e.g., via the security area 332), and may provide data received from the secure virtual core (e.g. the security area 420). Also, the general area input/output interface 411 may provide data to the biometric information recognition service module 412 or receive and process data.

The biometric information recognition service module 412 may include a database engine (not shown) for reading or storing information included in the memory 330, a biometric information daemon (not shown), and a security area interface (not shown). The biometric information recognition service module 412 may process data received from the general area input/output interface 411 and provide back the processed data to the general area input/output interface 411. Further, the biometric information recognition service module 412 may receive information on a processing result of the biometric information received from the general area input/output interface 411.

The biometric information recognition application 412 may receive a processing result based on biometric information from the biometric information recognition service module 412 and provide the result to the user through a graphic user interface. The biometric information recognition application 413 may provide a processing result based on the biometric information, for example, such as recognition completion, recognition failure, storage completion, approval, or approval failure to the user through a display (for example, the display 150 or 260).

The security area 312 may include a security area input/output interface 421, a biometric information processing module 422, and a biometric information communication module 423.

The security area input/output interface 421 may include an interface (not shown) for receiving a signal or data from the general area input/output interface 411 of the general area 410 and a driver (not shown) for receiving an interrupt signal from the biometric sensor module 340. When data or a signal is received from the general virtual core 311, the security area input/output interface 421 may provide the data or signal to the biometric information processing module 422. Further, when an interrupt is received from the biometric sensor module 340, the security area input/output interface 421 may provide the interrupt and the data received from the biometric sensor module 340 to the biometric information processing module 422.

The biometric information processing module 422 may include a platform abstraction layer (not shown) for transmitting/receiving data to/from the security area input/output interface 421, an effectiveness service processing unit (not shown) for inspecting effectiveness of the biometric information, comparing the biometric information, providing a result of the comparison, and a secure storage module (not shown) for encrypting and decrypting the biometric information and temporarily storing the encrypted or decrypted biometric information. The secure storage module may be implemented in the form of secure storage device (not shown) such as a buffer or a memory or the form of embedded Secure Element (eSE), or may include both.

Further, when the biometric information processing module 422 receives biometric information from the security area input/output interface 421, the biometric information processing module 422 may extract a feature, and may encrypt the extracted feature data and temporarily store the encrypted data or store the encrypted data in a predetermined area for storing security data of the memory 330. In addition, when data for a comparison with the pre-stored biometric data is input, the biometric information processing module 422 may read and decrypt the stored data and compare the decrypted data with the input data, or may encrypt the input data and directly compare the encrypted data with the read data. As described above, information on a result may be provided to the information communication module 423 and/or the security area input/output interface 421.

The biometric information communication module 423 may encrypt data according to a predetermined encryption method and form a secure channel with the server 106 to perform communication. The biometric information communication module may be located in the security area 420 or in the general area 410 as necessary. When the biometric information processing module 422 is located in the general area 410, the biometric information processing module 422 may perform an encryption and decryption functions for maintaining a secure channel in the general area or may keep only the encryption and decryption functions for forming the secure channel in the security area 420.

Then, an operation of registering biometric information through the configuration described above will be described. The following description will be made based on an assumption that fingerprint data is acquired and used among the biometric information for convenience of the description. However, as described above, it is apparent to those skilled in the art to equally apply a method described below to any biometric information through which the user can be identified, such as information on a fingerprint, face, iris, voice, lines of the palm, or veins. When the biometric sensor module 340 is driven, the biometric sensor module 340 may generate an interrupt signal and provide the generated interrupt signal to the general area input/output interface 411, for example, at a time point when a fingerprint input is requested and a fingerprint input operation is recognized. Accordingly, the general area input/output interface 411 may generate a signal for informing the security area input/output interface 421 of the driving of the biometric sensor module 340.

When an interrupt signal is received from the general area input/output interface 411, the security area input/output interface 421 may receive fingerprint data provided from the biometric sensor module 340. At this time, the provided fingerprint data is raw data acquired from the biometric sensor module 340 without any change. The security area input/output interface 421 may provide the data acquired from the biometric sensor module 340 to the biometric information processing module 422.

The biometric information processing module 422 may generate (extract) a biometric template by using acquired biometric information and encrypt the extracted template. In some implementations, the biometric information processing module may encrypt the template by using a predetermined key. In some implementation, the biometric information processing module 422 may use a unique ID of a chipset of the biometric sensor or a processor as the encryption key. Through the use of the unique ID of the component included in the electronic device, another electronic device cannot decrypt the encrypted biometric information even though the other electronic device acquires the encrypted biometric information.

The biometric information processing module 422 may provide the encrypted template to the general area input/output interface 411 through the security area input/output interface 421. Then, the general area input/output interface 411 may provide the encrypted biometric information to the biometric information recognition service module 412.

The biometric information recognition service module 412 may store the encrypted template in a predetermined area for storage of the security information in the memory 330 by using an external database engine. When the encrypted biometric information is completely stored, the biometric information recognition service module 412 may provide information on the biometric information acquisition and storage completion to the biometric information recognition application 413, so that the biometric information recognition application 413 can inform the user of the biometric information acquisition completion and storage completion through the display (for example, the display 150 or 260).

Further, an example of storing one piece of fingerprint information has been described above. However, the same operation can be applied when two or more pieces of fingerprint information are stored. When two or more pieces of fingerprint information are stored, information indicating whether the right or left hand corresponds to the fingerprint information and information indicating which finger corresponds to the fingerprint information may be additionally configured. For example, each of the fingerprint information may correspond to a different finger and/or hand of a user.

A process for verifying a user by using the biometric information stored as described above will be now described.

The operation for verifying the user by using the biometric information may be basically performed at a time point when the biometric sensor module 340 is driven. However, when the verification using the biometric information is required, a pre-stored biometric template may be read in advance. Hereinafter, for convenience of the description, it is assumed that the biometric sensor module 340 is first driven, data is received from the biometric sensor module 340, and then pre-stored data is read.

When the biometric sensor module 340 is driven, the biometric sensor module 340 may generate an interrupt signal and provide the generated interrupt signal to the general area input/output interface 411, for example, when a fingerprint input is requested and a fingerprint input operation is recognized. Accordingly, the general area input/output interface 411 may generate a signal for informing the security area input/output interface 421 of the driving of the biometric sensor module 340.

When an interrupt signal is received from the general area input/output interface 411, the security area input/output interface 421 may receive a fingerprint captured (provided) by the biometric sensor module 340. At this time, the provided fingerprint information (for example fingerprint sample) is raw data acquired from the biometric sensor module 340 without any change. The security area input/output interface 421 may provide the biometric sample to the biometric information processing module 422.

Upon receiving the biometric sample, the biometric information processing module 422 may make a request for reading a pre-stored biometric sample through the security area input/output interface 421. For example, the biometric information processing module may transmit to the biometric information recognition service module 412 a signal requesting the pre-stored biometric template. In some implementations, the signal may be transmitted through the general area input/output interface 411. The biometric information recognition service module 412 may read encrypted biometric information stored in the memory 330 through the general area input/output interface 411 using a database engine included in the biometric information recognition service module 412. Thereafter, the biometric information recognition service module 412 may provide the encrypted biometric template to the security area input/output interface 421 (e.g., through the general area input/output interface 411. Accordingly, the security area input/output interface 421 may provide the encrypted biometric information stored in the memory 402 to the biometric information processing module 422. As described above, the encrypted biometric information stored in the memory 402 may be provided to a platform abstraction layer of the biometric information processing module 422.

Thereafter, the biometric information processing module 422 may decrypt the encrypted biometric information by using an ID of a particular component included in the electronic device as described above. Then, the biometric information processing module 422 may compare the biometric information captured by the biometric sensor module 340 and compare the information to the pre-stored biometric information received from the recognition service module 412. In some implementations, the biometric information may be compared by extracting a template from the biometric information and matching the extracted template to the pre-stored biometric template.

In some aspects, the biometric information processing module 422 may generate an indication of whether the pre-stored biometric template matches the captured biometric information (for example, biometric sample), and provide the generated information to the general area input/output interface 411 through the security area input/output interface 421. Upon receiving the indication, the general area input/output interface 411 may provide indication to the biometric information recognition service module 412. The biometric information recognition service module 412 may inform the biometric information recognition application 413 whether the pre-stored biometric template matches the captured biometric information. Then, the biometric information recognition application 413 may inform the user on whether there is a match by displaying graphic or text information on the display (for example, the display 150 or 260).

Figure 5:
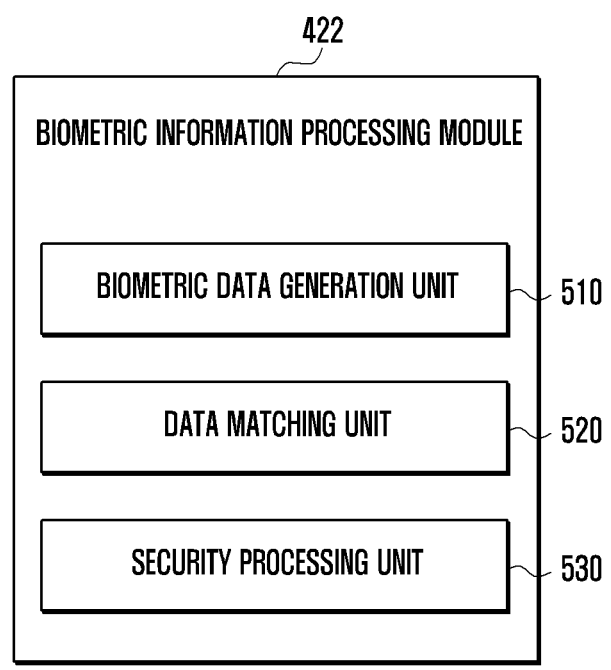
FIG. 5 is a block diagram of a biometric information processing module, according to aspects of the disclosure.

FIG. 5 is a block diagram of a biometric information processing module, according to aspects of the disclosure.

In FIG. 5, a biometric information processing module 422 of the security area may include a biometric data generation unit 510, a data matching unit 520, and a security processing unit 530.

The biometric data generation unit 510 may generate biometric templates based on data captured biometric sensing module 340.

According to aspects of the disclosure, the biometric data generation unit 510 may acquire a biometric image (for example, a fingerprint image, an iris image, or a facial image) from the biometric sensor module 340. The biometric image may be a photographic image, an infrared image, an ultrasonic image, etc. The biometric data generation unit 510 may extract unique personal template information based on the biometric image. For example, in the finger print recognition, the template information may be minutiae such as a ridge end, a bifurcation point, a core point, or a delta point. The biometric data generation unit 510 may be calculated in a preset format (or frame) to identify a degree of the matching between the template information and stored biometric registration data. For example, the type of information in the preset format may correspond to the template type. The present disclosure is not limited to any specific type of biometric image and/or technology for capturing biometric information.

When a biometric information registration request is detected, the biometric data generation unit 510 may store generated biometric data in a memory (for example, the memory 330) as registration information. The biometric information registration request may be made through a security signal transmitted from a from the general virtual core 311 to the secure virtual core 312.

When the biometric recognition request is detected, the data matching unit 520 may determine whether biometric authentication data input for the biometric recognition (e.g., a biometric sample captured using the biometric sensor module 340) matches pre-stored biometric registration data (e.g., a pre-stored biometric template). The biometric recognition request may be made through a security signal transmitted from the general virtual core 413 to the secure virtual core 423.

In some aspects, the data matching unit 520 may calculate a matching value as a result of comparing a pre-stored biometric template to a captured biometric sample. The matching value may be a value indicating a degree of matching between the biometric information (e.g., biometric authentication data) and the biometric registration data (e.g., pre-stored biometric template).

For example, the matching value may be the number of feature points which correspond to each other (or match each other) among feature points included in the respective pieces of biometric information in the data matching. Alternatively, the matching value may be calculated according to statistical data or a probabilistic function in consideration of distances or directions between the feature points included in the respective pieces of biometric data or the similarity of arrangement types between the feature points.

The data matching unit 520 may determine whether the biometric authentication is successful based on the matching value of the template information. For example, the data matching unit 520 may determine the biometric authentication is successful when the matching value is larger than a preset threshold, and determine that the biometric authentication fails when the matching value is equal to or smaller than the preset threshold.

The data matching unit 520 may transmit result information (for example, a true-false type signal) indicating whether the authentication is successful or not to a biometric recognition function control module within the general area.

The security processing unit 530 may make encrypt and decrypt the biometric data. The security processing unit 530 may generate a unique key based on unique identification information of the device. For example, the unique key may only accessible by the secure virtual core 312 when the electronic device is in the security mode.

In some implementations, when registering biometric information, the security processing unit 530 may encrypt a generated biometric information by using the unique key and store the encrypted biometric information in the security area of the memory. In the biometric authentication recognition, the security processing unit 530 may acquire the encrypted biometric information from the security area of the memory and decrypt the encrypted biometric information by using the unique key. The security processing unit 530 may transmit the decrypted biometric information to the data matching unit. In this case, a function for generating the unique key may have a value which can be generated when the secure virtual core operates, and access thereof may be restricted when the general virtual core operates.

In some implementations, the security processing unit 530 may encrypt a given biometric information by using the unique key and transmit the encrypted biometric data to the biometric information recognition service module 412 for permanent storage 412. Afterwards, when biometric data captured by the biometric sensor module 340 needs to be authenticated, the security processing unit 530 may receive the encrypted biometric information to the biometric template back from the biometric recognition function control module 412 and decrypt the biometric information by using the unique key generated in the security mode. The security processing unit 530 may then transmit the decrypted biometric information to the data matching unit 520.

In some implementations, the security processing unit 530 may transform the biometric information through a transform function to generate pseudo data. The transform function may include a one way function or a data arrangement function, and a function using a value which can be acquired in the security mode or from separate secure hardware may be used. The transform function may be stored as metadata of the biometric information.

The security processing unit 530 may transmit the generated pseudo data to the data matching unit 520 and the data generation unit 510. For example, the data generation unit 510 may store the pseudo data as registration information. Afterwards, the data matching unit 510 may determine whether the biometric authentication is successful by comparing the registered pseudo data to newly-acquired (or captured) biometric information.

The security processing unit 530 may variably operate the transform function to generate the pseudo data. For example, when the biometric recognition information is exposed to the outside unintentionally, the security processing unit 530 may change the transform function and newly generate pseudo data through the changed transform function. When the biometric information is exposed to the outside, metadata of the biometric information is also updated, so that the security processing unit 530 may newly update or may discard the existing biometric data.

In some implementations, an electronic device may include a biometric sensor module for biometric recognition; and a processor for detecting a biometric information input event from the biometric sensor module in the general area, acquire a biometric sample that is captured by via the biometric sensor module, compare the biometric sample to a pre-stored biometric information (including a biometric template) and output an indication of an outcome of the comparison.

In some implementations, the processor may when a user registers with the electronic device, the processor may generate a biometric information corresponding to the user (e.g., based on a sample captured via the biometric sensor module), encrypt the template, and register the biometric information in a database for subsequent retrieval.

The processor may transmit the encrypted biometric data to the general area and store the encrypted biometric data in the general area.

The processor may subsequently retrieve the biometric information from the database, decrypt the encrypted registration data using a unique key generated based on unique identification information, perform biometric authentication by comparing the decrypted template with a newly-acquired biometric sample belonging to a user who attempts to authenticate himself. If the biometric template matches the biometric sample belonging to the user, the user is positively authenticated.

In some implementations, the processor may transmit a binary signal indicating whether the binary template matches the binary sample.

In some implementations, the processor may transform the biometric data to pseudo data using a transform function, encrypt pseudo data, and store the encrypted pseudo data as biometric registration information.

In some implementations, the processor may perform the biometric recognition authentication based on the pseudo data.

In some implementations, the processor may make a control to change the transform function when the biometric information is exposed to the outside.

In some implementations, the transform function may use a value provided in the security mode or through separate security hardware.

Figure 6:
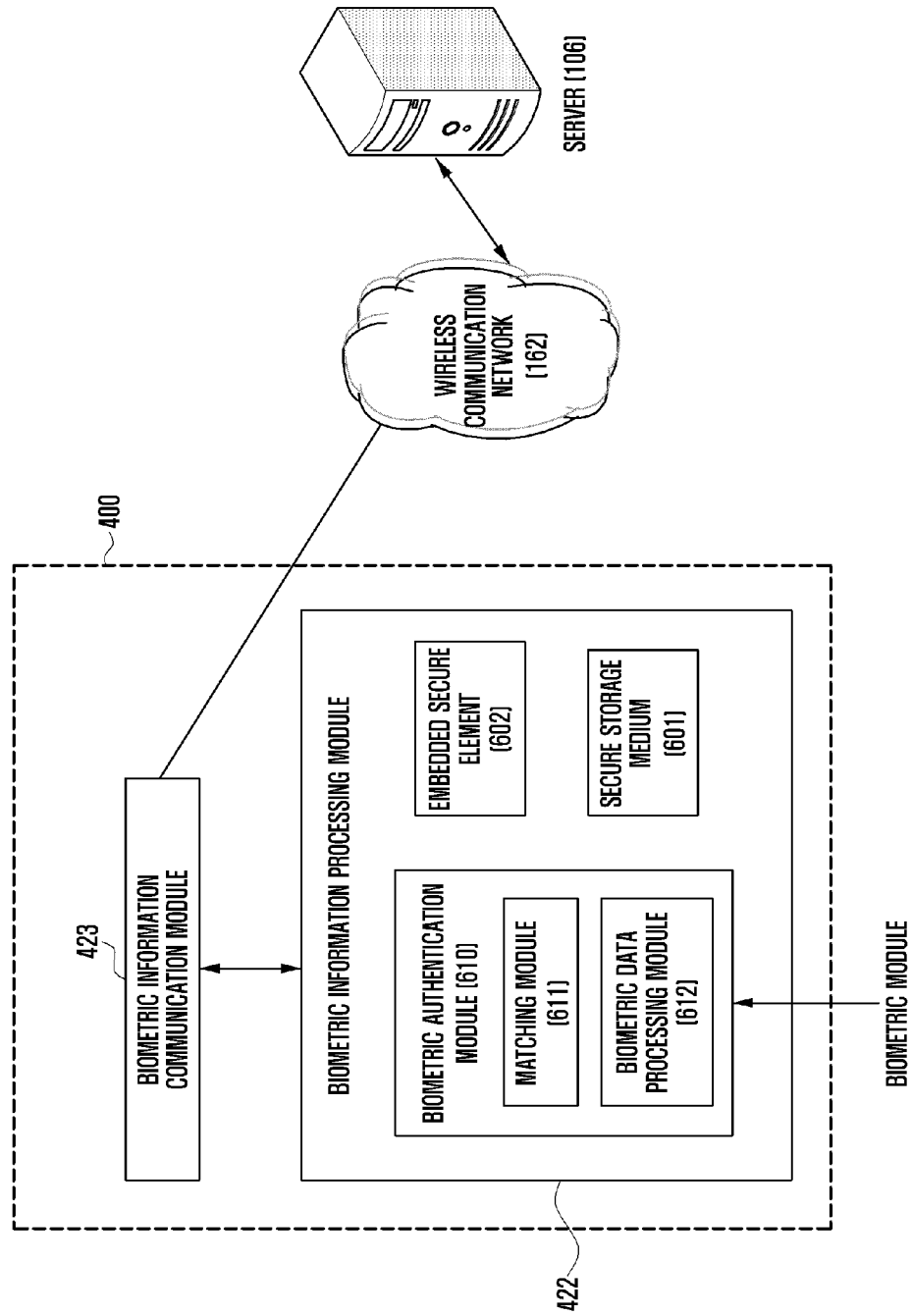
FIG. 6 is a block diagram illustrating an example of a process performed by the electronic device, according to aspects of the disclosure.

FIG. 6 is a block diagram illustrating an example of a process performed by the electronic device of FIG. 1, according to aspects of the disclosure.

When an authentication request is received from the server 106, the biometric information communication module 423 may negotiate an encryption/decryption scheme or an encryption scheme with the server 106 and encrypt the biometric information on a preset channel according to the negotiated scheme to form a secure channel. Further, when control data or a program for performing the encryption/description or encryption scheme required by the server 106 is not installed in the electronic device 400, the biometric information communication module 423 may receive and store the corresponding data or program from the server 106. The corresponding data or program may be then used to encrypt all communications that are sent over the secure channel.

When a message is encrypted and transmitted through the secure channel, the biometric information communication module 423 may encrypt a predetermined message provided from the biometric information processing module 422. A message required to be encrypted may include authentication result information and also other pieces of information. Further, when a connection with the wireless communication network 162 is made, the biometric information communication module 423 may insert a type of connected network or ID information and position information into the message. Information included in another predetermined message may include a prearranged message for identifying an authentication result by the server 106, a temporary password generated by a common function, or information made of a combination thereof.

The biometric information processing module 422 may include a biometric authentication module 610, an embedded Secure element (eSE) 602, and a secure storage medium 601 therein. Further, the embedded secure element 602 or the secure storage medium 601 may be actually implemented in the memory 330. The embedded secure element 602 may store an encrypted or non-encrypted authentication message (Info. message) generated by the biometric authentication module 610. The secure storage medium 601 may also store an encrypted or non-encrypted authentication message (Info. message) generated by the biometric authentication module 610.

The biometric authentication module 610 may include a matching module 611 (for example, the data matching unit 520 of FIG. 5) and a biometric data processing module 612. The biometric authentication module 610 may further include other modules, but the description of the example of FIG. 6 will be made based on the form in which the biometric authentication module 610 includes only the matching module 611 and the biometric data processing module 612.

The matching module 611 may compare a pre-registered biometric template to a newly-captured biometric sample belonging to a user who attempts to authenticate himself. The matching module 611 may then generate information on matching or a matching rate. Further, the matching module 611 may generate additional information when the matching is required. The additional information may be generated together with a biometric matching conformity score, an account when the matching is linked with the account, trial times, and information indicating which finger corresponds to biometric information when the biometric information is a fingerprint. The information indicating which finger corresponds to the biometric information may be preset when the user registers the biometric information.

The biometric data processing module 612 may capture raw data input from the biometric sensor module 340 and extract features to generate a biometric template. Further, the biometric data processing module 612 may receive and decrypt a pre-registered biometric template. In some cases, the encryption and the decryption of template information may be performed by another module which is not illustrated in FIG. 6, for example, a separate encryption/decryption module.

The wireless communication network 162 of FIG. 6 may have various forms. For example, the wireless communication network 162 may be any network which can access a predetermined server through bidirectional wireless communication such as a 3G network, an LTE network, an LTE-A network, or a WiFi network. Further, the wireless communication network 162 may be a single network or a hybrid network in which various types of wired/wireless networks coexist.

The server 106 is a predetermined server existing on the network and may provide data or services to the electronic device. Further, the server 106 may ask for the user operating the electronic device to be authenticated by the electronic device. In some implementations, the server request the user to be authenticated via a biometric authentication scheme.

Figure 7:
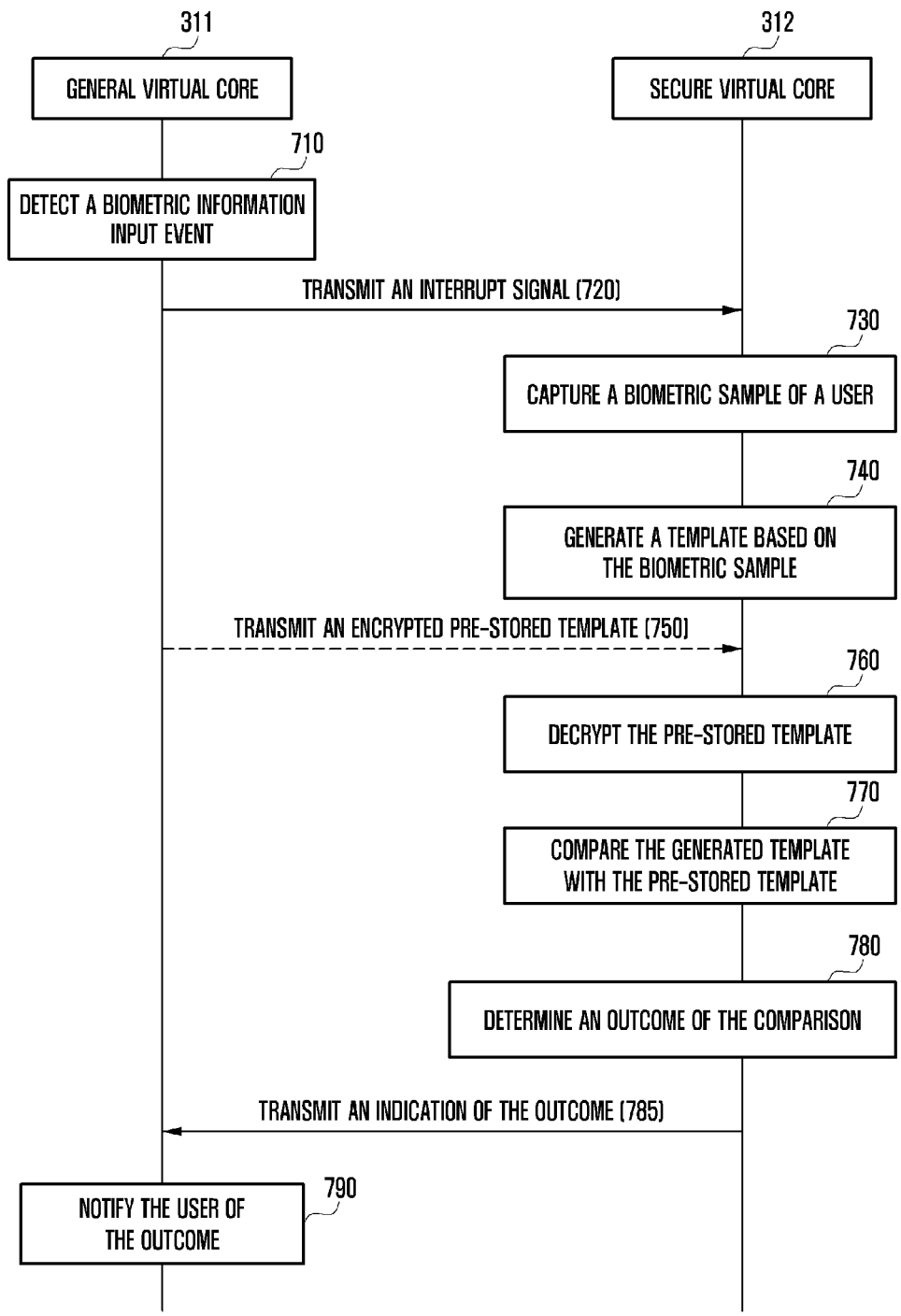
FIG. 7 is a sequence diagram of an example of an authentication process, according to aspects of the disclosure.

FIG. 7 is a sequence diagram of an example of an authentication process, according to aspects of the disclosure. In step 701, the processor may detect a biometric information input event based on an interrupt signal transmitted from the biometric sensor module 340 or the biometric sensor 410 in the general area (for example, the general area 331 of FIG. 3 or the general area 410 of FIG. 4) for biometric recognition authentication (for example, authentication mode). In some implementations, when a function request for the biometric recognition authentication is made, the processor may activate the biometric sensor module and sense a sensing object through the biometric sensing module.

In step 720, when the biometric information input event is detected, the general virtual core 311 may transmit an event detection signal to the secure virtual core 312. For example, the event detection signal may be a security interrupt signal.

In step 730, the processor of the security area may acquire sensing data from the biometric sensing module 340. In step 740, the processor of the security area may calculate unique template information of a recognition object based on the sensing data and generate biometric authentication data for the biometric recognition. The biometric authentication data may have a preset format, for example, template type.

In step 750, the processor of the security area may receive encrypted biometric registration data from the general area or acquire encrypted biometric registration data from the memory allocated to the security area.

In step 760, the processor of the security area may decrypt the stored biometric registration data (for example, encrypted biometric data). For example, when the encrypted biometric information is acquired, the processor of the security area may decrypt the encrypted biometric data by using a unique key. The processor may acquire function information for generating the unique key from the memory allocated to the security area having restricted access and generate the unique key through the acquired function information.

In step 770, the processor of the security area may compare the biometric authentication data and the template information calculated from the biometric registration data and may calculate a matching value.

In step 780, the processor of the security area may determine whether the biometric authentication is successful based on the matching value of the template information. For example, the processor may determine the biometric authentication is successful when the matching value is larger than a preset threshold, and determine that the biometric authentication fails when the matching value is equal to or smaller than the preset threshold.

In step 785, the processor of the security area may transmit a biometric recognition authentication result to the general area. In step 790, the processor of the general area may provide the user with the biometric recognition authentication result through a user interface or a component of the electronic device.

Meanwhile, when the biometric information recognition fails due to raw data quality deterioration, the processor may perform a re-recognition process. To this end, the processor of the general area may make a control to provide at least one of feedback (for example, visual or auditory effects) of recognition failure and acquisition of new sensing data through the user interface.

Figure 8:
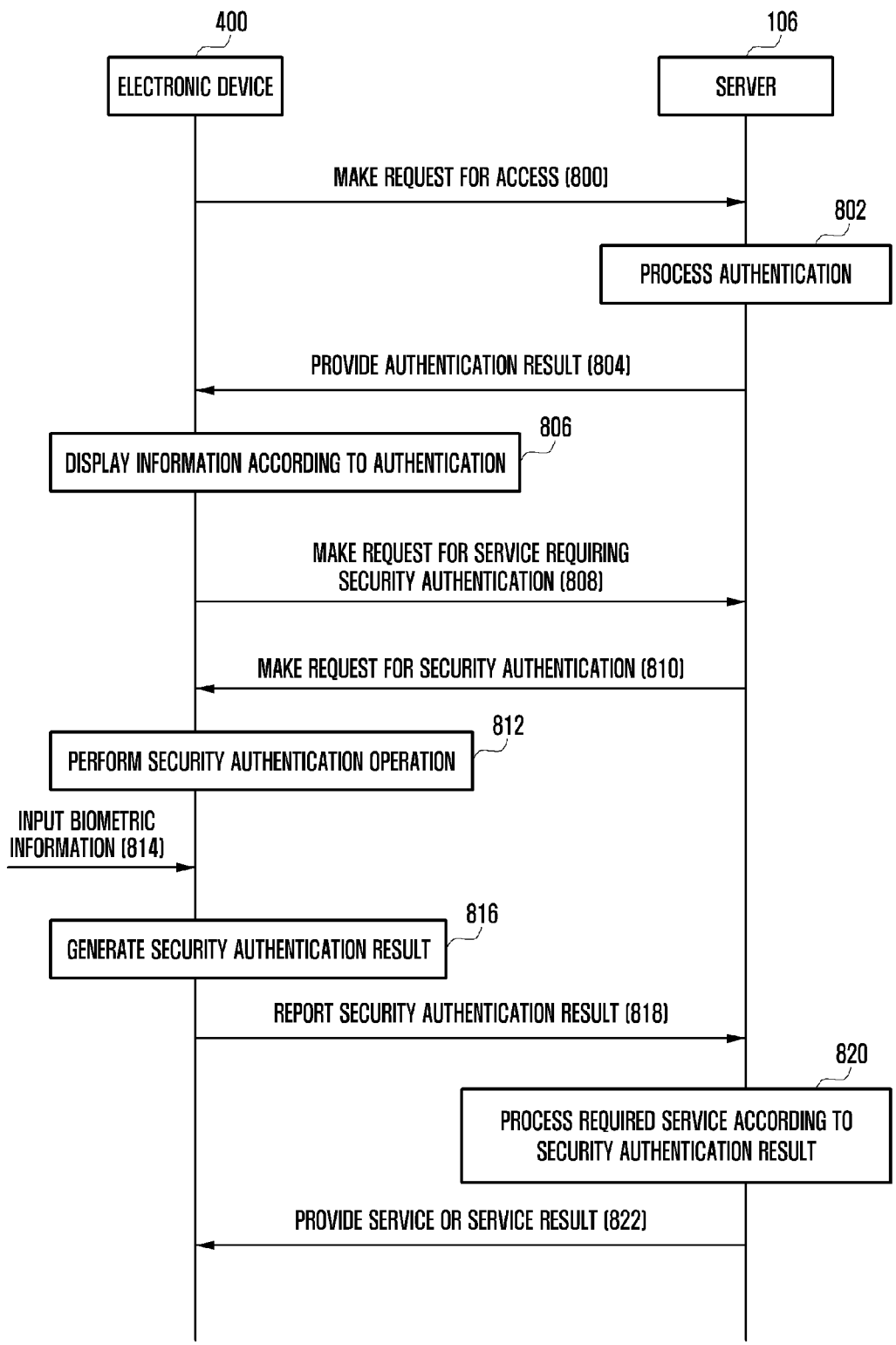
FIG. 8 is a sequence diagram of an example of a process for executing a client-server transaction, according to aspects of the disclosure.

FIG. 8 The electronic device 400 may make a request for accessing the server 106 through the predetermined wireless communication network 162 in step 800. The server access request may be a general access request or may be an access request including an ID of the electronic device 400 or/and an ID and a password of the user. When the access request is made, the server 106 may perform an operation for processing authentication in step 802 and provide an authentication result in step 804. When the ID and password are input, the authentication result may be data according to the access success or information on an error in the ID or password. A description will be made hereinafter based on a case where the authentication is successful.

When the electronic device 400 receives the authentication result according to the authentication success in step 804, the electronic device 400 may display information according to the authentication in step 806. For example, the electronic device 400 may receive information in a state where a service provided by the server 106 can be received and display the information on the display (for example, the display 150 or 260). Thereafter, the user may receive various services from the server 106. The provision of the services is not further described herein.

Thereafter, when the user makes a request for a particular service requiring security authentication, the electronic device 400 may make a request for a service requiring security authentication in step 808. Then, the server 106 may ask for configuring a secure channel and make a request for security authentication in step 810. At this time, the ask for configuring the secure channel may be an operation of requesting transmission/reception of data by using an encryption/decryption method performed by the electronic device 400 or an encryption/decryption method provided by the server 106. For example, when the encryption/decryption method performed by the electronic device 400 is used, information on the encryption/decryption method performed by the electronic device 400 may be requested and a method that matches the method of encryption/decryption method performed by the server 106 may be selected. When the method of encryption/decryption method performed by the server 106 is used, the method of encryption/decryption method performed by the server 106 may be provided to the electronic device 400 and one of the methods provided by the electronic device 400 may be selected.

Alternatively, a particular encryption/decryption method provided by the server 106 may request transmission/reception of data. At this time, when the electronic device does not have a program or control data for performing the encryption/decryption method required by the server 106, the electronic device 400 may download the corresponding data from the server 106 to perform the method. In this case, the electronic device 400 may download a corresponding encryption program from the server 106 through the predetermined wireless network 162 and install the downloaded encryption program in the electronic device 400.

As described above, when the security authentication is requested, the electronic device 400 performs an operation for the security authentication by identifying whether the corresponding program exists and downloading the corresponding program in step 812. Further, the electronic device 400 according to the present invention may receive biometric information in step 814. At this time, the case where electronic device 400 receives the biometric information may correspond to a case where the user registers in advance the biometric information in the electronic device 400 or a case where the user makes a request for the biometric information for the security authentication to the server 106.

Further, when the user selects the biometric information authentication as the security authentication method, the server 106 may request the biometric information authentication. Accordingly, the operation of inputting the biometric information may be an operation for authenticating the user using the pre-registered biometric information as described above. Since the operation for authenticating the user using the biometric information has been described above, more detailed descriptions thereof will be omitted.

The biometric information communication module 423 of the electronic device 400 may configure a result generated by the biometric information processing module 422, that is, information on whether the biometric information matches the pre-registered data as a message in step 816, and transmit the generated message to the server 106 in step 818. At this time, the generated message may include one or more of information on whether pieces of information match each other, a match score, trial times, an account when the matching is linked with the account, information indicating which hand and which finger correspond to biometric information when the biometric information is a finger print, authentication time information, an authentication value of the electronic device, position information of the electronic device, network information (for example, information on a 3G network or a WiFi network), a temporary password generated by a common function, and a predetermined value by which an authentication result can be identified.

Further, when the electronic device 400 reports the security authentication result in step 818, the electronic device 400 may transmit the result in a state where a message is encrypted through a preset encryption method, that is, through a secure channel.

The server 106 may receive a result message through the secure channel in step 818, and decrypt the received message and process a required service when the decrypted message indicates the authentication success in step 820. The required service may be a product purchase service, a charged service, an adult authentication service, or a user authentication service.

After such processing, the server 106 may provide the service itself when the service is requested or provide a result of payment to the electronic device 400 through the secure channel when the payment is requested in step 822.

An authentication method using biometric information by an electronic device which can communication with a server may include reading and decrypting encrypted biometric information stored in the electronic device when a security authentication request is made from the server; receiving biometric information of the user in the security area and determining whether the biometric information of the user matches the decrypted biometric information; and configuring a message including information on a result of the determination and reporting the message to the server.

According to aspects of the disclosure, at least some of the devices (for example, modules or functions thereof) or the method (for example, operations) according to the present disclosure may be implemented by a command stored in a computer-readable storage medium in a programming module form. When the commands are executed by one or more processors (e.g. the processor 210), one or more processors can perform functions corresponding to the commands. The computer-readable storage media may be, for example, the memory 220. At least a part of the programming module may be implemented (for example, executed) by, for example, the processor 210. At least a part of the programming module may include, for example, a module, a program, a routine, a set of instructions and/or a process for performing one or more functions.

The computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to aspects of the disclosure may be executed sequentially, in parallel, repeatedly, or in a heuristic manner. Further, some operations may be executed according to another order or may be omitted, or other operations may be added.

According to aspects of the disclosure, at least some of the devices (for example, modules or functions thereof) or the method (for example, operations) according to the present disclosure may be implemented by a command stored in a computer-readable storage medium in a programming module form. When the commands are executed by one or more processors (e.g. the processor 210), one or more processors can perform functions corresponding to the commands. The computer-readable storage media may be, for example, the memory 220. At least a part of the programming module may be implemented (for example, executed) by, for example, the processor 210. At least a part of the programming module may include, for example, a module, a program, a routine, a set of instructions and/or a process for performing one or more functions.

FIGS. 1-8 are provided as an example only. At least some of the steps discussed with respect to these figures can be performed concurrently, performed in a different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. A method of performing authentication using biometric information by an electronic device, the method comprising:

initiating, by a secure virtual core, a transaction with a server;

receiving a biometric authentication request from the server;

retrieving, by the secure virtual core, a biometric information stored in a secure portion of a memory in response to the biometric authentication request;

acquiring, by a biometric sensor at least one biometric attribute of a user and outputting biometric information of the user;

determining, in the secure virtual core, whether the acquired biometric information is matched to the retrieved biometric information;

transmitting a message including an outcome of the determining to the server, wherein the memory is partitioned into a general portion and the secure portion being not accesible by a general virtual core, wherein the message is encrypted through a preset method, wherein an encryption program is received from an external device to encrypt the message if the electronic device does not support the preset encryption method, and wherein the electronic device comprises at least one processor including at least the general virtual core and the secure virtual core.

2. The method of claim 1, further comprising when the biometric information of the user is acquired, extracting biometric template from the biometric information of the user;

decrypting the retrieved biometric information; and comparing the extracted biometric template and the decrypted biometric information to determine whether the information matches each other.

3. The method of claim 1, wherein the message transmitted to the server includes one or more of a match score, trial times, an account when the matching is linked with the account, information indicating which hand and which finger correspond to biometric information if the biometric information is a fingerprint, authentication time information, an authentication value of the electronic device, position information of the electronic device, network information, a temporary password generated, and a predetermined value by which an authentication result can be identified.

4. The method of claim 3, wherein the generated temporary password is a common function value between the electronic device and the server.

5. An apparatus for performing authentication using biometric information, the apparatus comprising:

at least one processor comprising at least a general virtual core and a secure virtual core;

a biometric sensor configured to acquire information regarding at least one biometric attribute of a user and output biometric information corresponding to the acquired biometric attribute;

a memory partitioned into a secure portion and a general portion, the secure portion for storing the biometric information and the secure portion being not accesible by the general virtual core;

a biometric information communication module operated on the secure virtual core is configured to provide authentication information to a server; and a biometric information processing module operated on the secure virtual core is configured to:

in response to a request for security authentication, retrieve the biometric information stored in the secure portion of the memory, acquire a biometric information of the user using the biometric sensor, determine whether the acquired biometric information is matched to the retrieved biometric information, and transmit an outcome of the determining to the server, wherein the message is encrypted through a preset method, and wherein the biometric information processing module receives a encryption program to encrypt the message if biometric information processing module does not support the preset encryption method.

6. The apparatus of claim 5, wherein, the biometric information processing module is configured to extract biometric template from the biometric information of the user, and decrypts the retrieved biometric information, if the biometric information processing module acquires the biometric information of the user, and the biometric information processing module compares the extracted biometric template and the decrypted biometric information to determine whether the information matches each other.

7. The apparatus of claim 5, wherein the message transmitted to the server includes one or more of a match score, trial times, an account when the matching is linked with the account, information indicating which hand and which finger correspond to biometric information if the biometric information is a fingerprint, authentication time information, an authentication value of an electronic device, position information of the electronic device, network information, a temporary password generated, and a predetermined value by which an authentication result can be identified.

8. The apparatus of claim 7, wherein the generated temporary password is a common function value between the electronic device and the server.

* * * * *